(12) United States Patent
Yasui et al.

(10) Patent No.: US 12,135,546 B2
(45) Date of Patent: Nov. 5, 2024

(54) MOBILE OBJECT CONTROL SYSTEM, MOBILE OBJECT, MOBILE OBJECT CONTROL METHOD, AND STORAGE MEDIUM

(71) Applicant: HONDA MOTOR CO., LTD., Tokyo (JP)

(72) Inventors: Yuji Yasui, Wako (JP); Kentaro Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 17/680,403

(22) Filed: Feb. 25, 2022

(65) Prior Publication Data

US 2022/0276648 A1 Sep. 1, 2022

(30) Foreign Application Priority Data

Mar. 1, 2021 (JP) .................. 2021-031626

(51) Int. Cl.
*G05D 1/00* (2024.01)
*G06F 3/01* (2006.01)
*G06V 40/20* (2022.01)

(52) U.S. Cl.
CPC ......... *G05D 1/0016* (2013.01); *G05D 1/0214* (2013.01); *G06F 3/017* (2013.01); *G06V 40/28* (2022.01)

(58) Field of Classification Search
CPC .. G05D 1/0214; G05D 1/0016; G05D 1/0231; G05D 1/0251; G05D 1/0253; G05D 1/0221; G05D 1/0223; G05D 1/0257; G05D 1/0285; G05D 1/0276; G05D 1/2295; G05D 1/2297; G05D 1/244; G05D 2105/20; G05D 2105/22; G05D 2105/24; G05D 2107/10; G05D 2107/13; G05D 2107/17; G05D 2107/80; G06F 3/017; G06F 3/167; G06F 3/012; G06F 3/013; G06V 20/56; G06V 20/58; G06V 40/10; G06V 40/103;
(Continued)

(56) References Cited

U.S. PATENT DOCUMENTS

2019/0004508 A1* 1/2019 Bonander ............. B60W 30/06
2019/0057209 A1* 2/2019 Dyer ....................... G06F 21/44
(Continued)

FOREIGN PATENT DOCUMENTS

JP 2009-223172 10/2009
JP 2020-163906 10/2020

OTHER PUBLICATIONS

Japanese Office Action for Japanese Patent Application No. 2021-031626 mailed Jul. 16, 2024.

*Primary Examiner* — Russell Frejd
*Assistant Examiner* — Brandon Z Willis
(74) *Attorney, Agent, or Firm* — Amin, Turocy & Watson, LLP

(57) ABSTRACT

A mobile object control apparatus acquires an image, recognizes an indication of a user, recognizes a first region that a mobile object is able to enter and a second region that the mobile object is not able to enter on the basis of the image, and determines a target position to which the mobile object will move on the basis of the indication from the user, the first region that the mobile object is able to enter, and the second region that the mobile object is not able to enter.

13 Claims, 14 Drawing Sheets

(58) Field of Classification Search
CPC .... G06V 40/107; G06V 40/11; G06V 40/113; G06V 40/117; G06V 40/20; G06V 40/28; B60W 60/00253; B60W 2540/041; B60W 2540/043; B60W 2540/21; B60W 2540/225; B60W 2554/4029

See application file for complete search history.

(56) References Cited

U.S. PATENT DOCUMENTS

| | | | |
|---|---|---|---|
| 2019/0208049 A1* | 7/2019 | Iagnemma | G08G 1/202 |
| 2020/0310430 A1 | 10/2020 | Shoda et al. | |
| 2022/0214690 A1* | 7/2022 | Nichols | G01C 21/3492 |
| 2022/0250657 A1* | 8/2022 | Kratz | H04W 4/40 |

* cited by examiner

FIG. 6

| | | |
|---|---|---|
| ATTRIBUTES OF CLOTHES | COLORS OF CLOTHES | |
| | PRESENCE/ABSENCE OF HAT | |
| BODY ATTRIBUTES | SEX | |
| | AGE | |
| TARGET | TARGET DESIGNATED BY USER | |

FIG. 7
| (1) | STANDING (STOPPING) | 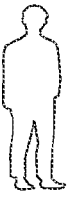 |
|---|---|---|
| (2) | WALKING |  |
| (3) | RUNNING |  |
| (4) | SHAKING HAND |  |
| (5) | SHOWING SMARTPHONE |  |
| (6) | INDEFINITE ACTION AND INTENTION TO DISPLAY PRESENCE |  |
| (7) | FACE DIRECTION |  | ns.
MOBILE OBJECT CONTROL SYSTEM, MOBILE OBJECT, MOBILE OBJECT CONTROL METHOD, AND STORAGE MEDIUM

CROSS-REFERENCE TO RELATED APPLICATION

Priority is claimed on Japanese Patent Application No. 2021-031626, filed Mar. 1, 2021, the content of which is incorporated herein by reference.

BACKGROUND

Field

The present invention relates to a mobile object control system, a mobile object, a mobile object control method, and a storage medium.

Description of Related Art

In the related art, an object estimation system that estimates an object indicated by a person from among objects that are present in the vicinity of the person on the basis of utterances of the person and a motion other than the utterances is disclosed (Japanese Unexamined Patent Application, First Publication No. 2009-223172). In a case in which a word indicating a name of an object is recognized as a result of sound recognition, the object estimation system estimates an object specified by a person on the basis of the sound recognition with higher priority than an object specified on the basis of a motion other than an utterance of the person (a line of sight or a pointing direction of the person) and executes control in accordance with the position of the estimated object.

SUMMARY

However, it is not possible to perform control that reflects a user's intention in some cases according to the aforementioned technique.

The present invention was made in consideration of such circumstances, and an object thereof is to provide a mobile object control system, a mobile object, a control method, and a storage medium capable of realizing control that better reflects a user's intention.

The mobile object control system, the mobile object, the mobile object control method, and the storage medium according to the invention employ the following configurations.

(1): A mobile object control system including: a storage device configured to store instructions; and one or more processors, wherein the one or more processors execute the instructions stored in the storage device to: acquire an image, recognize an indication of a user, recognize a first region that a mobile object is able to enter and a second region that the mobile object is not able to enter on the basis of the image, decide a target position to which the mobile object will move on the basis of the indication from the user, the first region that the mobile object is able to enter, and the second region that the mobile object is not able to enter, and cause the mobile object to move to the determined target position.

(2): In the aforementioned aspect (1), the one or more processors execute the instructions to: detect a boundary between the first region and the second region, and determine the target position on the basis of the boundary.

(3): In the aforementioned aspect (2), wherein the one or more processors execute the instructions to: in a case in which an indication of the target position using a gesture of the user is recognized, determine, as the target position, a position with deviation from the boundary by a predetermined amount in a direction of the first region on the basis of the indication.

(4): In the aforementioned aspect (2) or (3), the one or more processors execute the instructions to: in a case in which an indication of the target position that accompanies a user's designation of a target is recognized, determine, as the target position, a position with deviation from the boundary within a predetermined range from the target by a predetermined amount in a direction of the first region on the basis of the position of the target and the boundary within the predetermined range.

(5): In the aforementioned aspect (4), the one or more processors execute the instructions to: determine a position with deviation from the boundary within the predetermined range in a direction of the user as the target position on the basis of the obtained boundary.

(6): In any of the aforementioned aspects (2) to (5), the one or more processors execute the instructions to: in a case in which an indication of approaching the user using a gesture of the user is recognized, determine a position with deviation from the boundary within a predetermined range from the user by a predetermined amount in a direction of the first region as the target position on the basis of a position of the user and the boundary within the predetermined range.

(7): In the aforementioned aspect (6), the target position is a stop position, and the one or more processors execute the instructions to: in a case in which the indication of approaching the user using the gesture of the user who is stopping is recognized, determine the position with deviation of the predetermined amount as the stop position.

(8): In any of the aforementioned aspects (1) to (7), he target position is a stop position, and the one or more processors execute the instructions to: determine the stop position on the basis of the indication.

(9): In any of the aforementioned aspects (1) to (8), the target position is a stop position, and the one or more processors execute the instructions to: direct an orientation of the mobile object when the mobile object stops at the stop position to a direction of a route directed to a destination of the user.

(10): In any of the aforementioned aspects (1) to (9), wherein the target position is a stop position, and the one or more processors execute the instructions to: in a case in which the stop position is not able to be determined, cause the mobile object to move into a vicinity of the user.

(11): In any of the aforementioned aspects (1) to (9), the target position is a stop position, and the one or more processors execute the instructions to: in a case in which the stop position is not able to be determined, ask the user about the stop position.

(12): There is provided a mobile object including: the control system in any of the aforementioned aspects (1) to (11).

(13): A mobile object control method according to an aspect of the invention includes, by a computer: acquiring an image: recognizing an indication of a user; recognizing a first region that a mobile object is able to enter and a second region that the mobile object is not able to enter on the basis of the image; determining a target position to which the mobile object will move on the basis of the indication from the user, the first region that the mobile object is able to enter, and the second region that the mobile object is not able to enter; and causing the mobile object to move to the determined target position.

(14): A non-transitory computer storage medium according to an aspect of the invention stores instructions causing a computer to execute: acquiring an image: recognizing an indication of a user: recognizing a first region that a mobile object is able to enter and a second region that the mobile object is not able to enter on the basis of the image: determining a target position to which the mobile object will move on the basis of the indication from the user, the first region that the mobile object is able to enter, and the second region that the mobile object is not able to enter; and causing the mobile object to move to the determined target position.

According to (1) to (14), the control system can realize control that better reflects user's intention by determining the target position to which the mobile object moves on the basis of the indication from the user, the first region that the mobile object can enter, and the second region that the mobile object cannot enter. For example, the control system can cause a vehicle to accurately or quickly move to the determined target position.

According to (3), the control system can cause the mobile object to move and cause the mobile object to stop at a position preferable for the user by determining the position with deviation from the boundary by the predetermined amount in the direction of the first region as the target position on the basis of the indication.

According to (4), the control system can improve user's convenience by causing the mobile object to move to the position based on the target designated by the user.

According to (5), the control system causes the mobile object to move to the position that does not overlap the target such that the user can easily access the mobile object. As a result, user's convenience is improved.

According to (9), the control system can allow the user to quickly travel to the destination in a case in which the user moves along with the mobile object, for example, by directing the orientation of the mobile object when the mobile object stops at the stop position to the direction of the route directed to the destination of the user.

According to (10), the control system can cause the mobile object to stop at a position preferable for the user in accordance with a behavior of the user.

BRIEF DESCRIPTION OF THE DRAWINGS

FIG. 6 is a diagram for explaining recognition of user's feature amounts (attributes) and a target.

FIG. 7 is a diagram showing an example of a user behavior.

DETAILED DESCRIPTION

Hereinafter, a mobile object control system, a mobile object, a mobile object control method, and a storage medium according to embodiments of the invention will be described with reference to the drawings. "As used throughout this disclosure, the singular forms "a", "an", and "the" include plural references unless the context clearly dictates otherwise.

Embodiments

[Overall Configuration]

Figure 1:
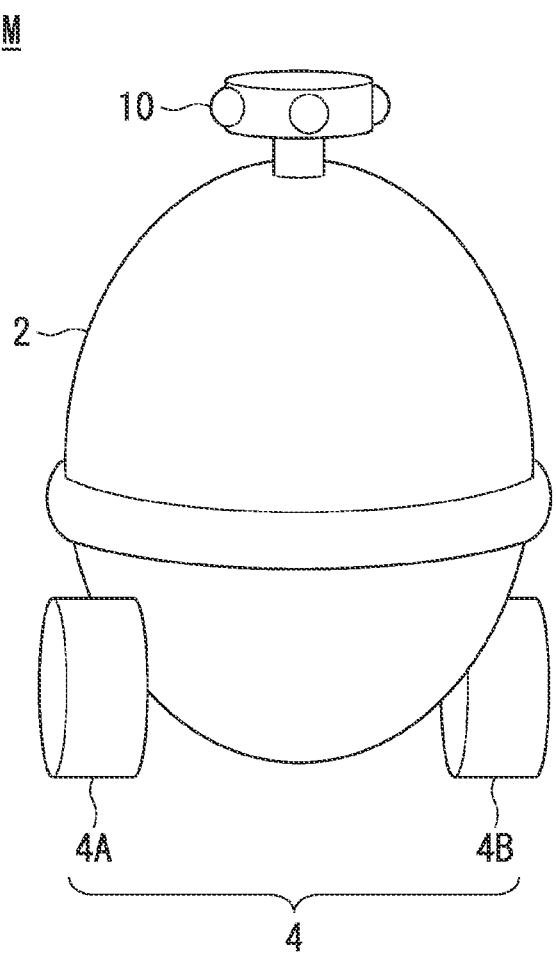
FIG. 1 is a diagram showing an example of a mobile object M including a control device according to an embodiment.

FIG. 1 is a diagram showing an example of a mobile object M including a control device according to an embodiment. The mobile object M is an autonomous mobile robot. The mobile object M supports user's motions. The mobile object M stops at s position designated by the user, carries the user thereon, and transports the user to a destination, for example. Although the mobile object M will be described based on the assumption that the mobile object M carries the user thereon and moves in the present embodiment, alternatively (or additionally), the mobile object M may transport items, may lead the user and move together with the user, or may follow the user and support the user's motions. The mobile object M may be adapted such that the user can ride thereon or such that the user cannot ride thereon.

The mobile object M includes a main body 2, one or more wheels 4 (4A and 4B in the drawing), and a camera 10. The main body 2 is provided with an exit/entrance through which the user can go in or out the main body 2, such as a door, which is not shown, for example, and the user can enter the main body 2 through the exit/entrance and get on the mobile object M. For example, the mobile object M causes wheels 4 to be driven on the basis of an image captured by the camera 10 and transports the user.

Although the present embodiment will be described on the assumption that the user gets on in the main body 2, alternatively (or additionally), a seat portion in which the user can be seated without getting on in the main body 2 in order for the user to move along the mobile object M, steps on which the user places his/her feet for moving, and the like may be provided. For example, the moving object may be scooter.

Figure 2:
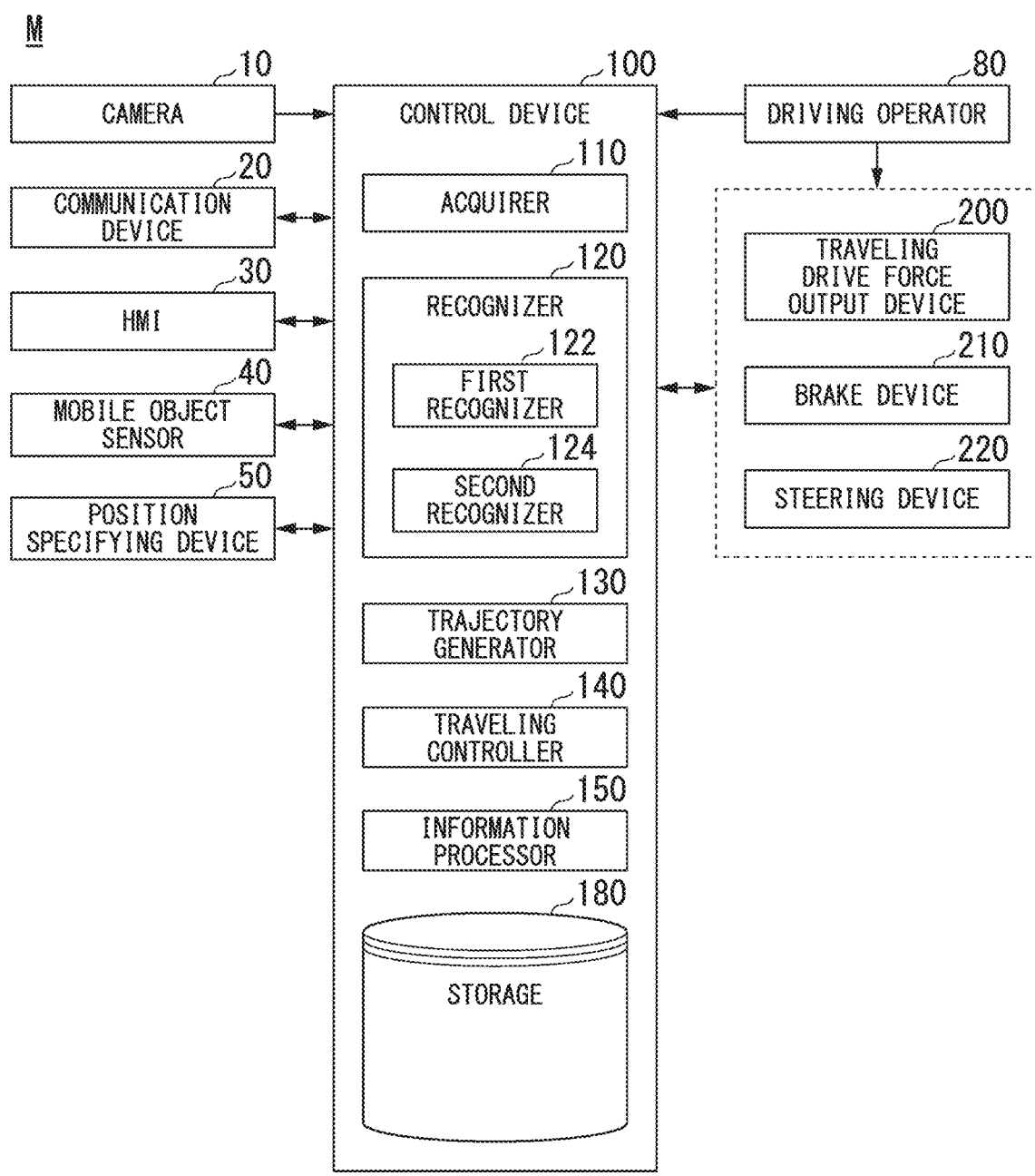
FIG. 2 is a diagram showing an example of other functional configurations included in the mobile object.

FIG. 2 is a diagram showing an example of other functional configurations included in the mobile object M. The mobile object M includes, for example, the camera 10, a communication device 20, an HMI 30, a mobile object sensor 40, a position specifying device 50, a driving operator 80, a control device 100, a traveling drive force output device 200, a brake device 210, and a steering device 220.

The camera 10 images the surroundings of the mobile object M. The camera 10 is, for example, a fisheye camera capable of imaging the surroundings of the mobile object M at a wide angle (at 360 degrees, for example). The camera 10 is attached to an upper portion of the mobile object M, for example, and images the surroundings of the mobile object M at a wide angle in the horizontal direction. The camera 10 may be realized by a combination of a plurality of cameras (a plurality of cameras that image a range of 120 degrees and a range of 60 degrees in the horizontal direction). The mobile object M may include a radar device or a LIDAR for detecting objects in addition to the camera 10.

The communication device 20 is a communication interface for communication with other devices using a cellular network, a Wi-Fi network, Bluetooth (registered trademark), dedicated short range communication (DSRC), or the like.

The HMI 30 presents various kinds of information to the user of the mobile object M and receives operations input by the user. The HMI 30 includes various display devices, a speaker, a buzzer, a touch panel, a switch, a key, and the like.

The mobile object sensor 40 includes a vehicle speed sensor that detects a speed of the mobile object M, an acceleration sensor that detects acceleration, a yaw rate sensor that determines angular speed around a vertical axis, an azimuth sensor that determines orientation of the mobile object M, and the like.

The position specifying device 50 specifies the position of the mobile object M on the basis of a signal received from a GNSS satellite. The position of the mobile object M may be specified or complemented by an inertial navigation system (INS) using outputs of the mobile object sensor 40.

The driving operator 80 includes, for example, an accelerator pedal, a brake pedal, a shift lever, a steering wheel, a deformed steering, a joystick, and other operators. A sensor that detects the amount of operations or presence/absence of operations is attached to the driving operator 80, and the detection result is output to the control device 100 or some or all of the traveling drive force output device 200, the brake device 210, and the steering device 220. In a case in which the mobile object M is controlled only through automatic driving, the driving operator 80 may be omitted.

The control device 100 includes, for example, an acquirer 110, a recognizer 120, a trajectory generator 130, a traveling controller 140, an information processor 150, and a storage 180. Each of the acquirer 110, the recognizer 120, the trajectory generator 130 (an example of the determiner), the traveling controller 140, and the information processor 150 is realized by one or more processors such as a central processing unit (CPU), for example, executing a program (software). Some or all of these components may be realized by hardware (a circuit unit: including a circuitry) such as a large scale integration (LSI), an application specific integrated circuit (ASIC), a field-programmable gate array (FPGA), or a graphics processing unit (GPU) or may be realized through cooperation of software and hardware. The program may be stored in the storage 180 (a storage device including a non-transitory storage medium) such as an HDD or a flash memory, and including map information 190, or may be stored in a detachable storage medium such as a DVD or a CD-ROM and installed in an HDD or a flash memory through attachment of the storage medium (non-transitory storage medium) to a drive device. Some of the functional units included in the control device 100 may be included in other devices. For example, the acquirer 110 and the recognizer 120 (one or both of a first recognizer 122 and a second recognizer 124, which will be described later) may be included in other devices, and the control device 100 may acquire a recognition result of the recognizer 120 from other devices and execute various kinds of processing on the basis of the acquired result. An image may be provided at a location different from that of the mobile object M such as a road shoulder, instead of the camera 10. In this case, the acquirer 110 acquires an image captured by a camera provided at a different location.

The acquirer 110 acquires an image captured by the camera 10 and captured by a user who is not in the mobile object M.

The recognizer 120 includes, for example, the first recognizer 122 and the second recognizer 124. The first recognizer 122 recognizes a position of the user, a gesture of the user, an action of the user, a direction pointed by a hand or an arm of the user, an indication from the user, and the like. The first recognizer 122 recognizes the gesture of the user, the action of the user, the direction pointed by the hand or the arm of the user, the indication, and the like on the basis of the image acquired by the acquirer 110 and a method such as pattern matching or deep learning, for example. The first recognizer 122 analyzes sound input through a microphone and recognizes indication included in the sound.

The second recognizer 124 uses functions of artificial intelligence (AI) or functions of a model given in advance, for example, or uses these functions in parallel to recognize objects and conditions in the surroundings of the mobile object M. For example, a function of "recognizing a region that the mobile object M can enter" may be realized by both recognition of roads, sidewalks, edge stones, and the like through deep learning and recognition based on conditions given in advance (signals that allow pattern matching) being executed in parallel, scored, and comprehensively evaluated. The second recognizer 124 may execute semantic segmentation processing, classify pixels inside an image frame into classes (such as objects, a first region to which the mobile object M can enter, and a second region that the mobile object M cannot enter, for example), and recognize a region that the mobile object M can enter on the basis of the classification result. In this manner, reliability of movement of the mobile object M is secured.

The second recognizer 124 recognizes states in the surroundings of the mobile object M, such as positions of objects, a speed, and an acceleration on the basis of the image captured by the camera 10. The positions of the objects are recognized as positions on absolute coordinates with a representative point (such as a center of gravity or a drive shaft center) of the mobile object M placed as an origin, for example, and are used for control. The positions of the objects may be represented by representative points, such as centers of gravity or corners, of the objects and may be represented by expressed regions. The "states" of the objects may include accelerations and jerks of the objects or "action states" (for example, whether an object is changing lanes or is trying to change lanes). The second recognizer 124 recognizes, for example, road compartment lines, road shoulders, edge stones, center dividers, guard rails, stop lines, barriers, traffic signs, and other traffic events. The second recognizer 124 recognizes the position and the posture of the mobile object M.

The trajectory generator 130 determines a target position to which the mobile object M will move on the basis of an indication from the user, the first region that the mobile object M can enter, and the second region that the mobile object M cannot enter. The target position is, for example, a stop position at which the mobile object M will stop or a traveling position to which the mobile object M will travel (or a moving position to which the mobile object M moves).

The trajectory generator 130 generates a target trajectory through which the mobile object M automatically (without depending on driver's operations) travels in the future such that the mobile object M can address conditions in the surroundings. The target trajectory includes, for example, a speed element. For example, the target trajectory is expressed as points (trajectory points), at which the mobile object M is to arrive, aligned in order. The trajectory points are points at which the mobile object M is to arrive at every predetermined traveling distance (about several [m], for example) in terms of a distance along a road, and in addition to this, a target speed and target acceleration per predetermined sampling time (about zero point several [see], for example) are generated as a part of the target trajectory. The trajectory points may be positions at which the vehicle M itself arrives at a sampling clock time for each predetermined sampling time. In this case, information regarding the target speed and the target acceleration is expressed as intervals of the trajectory points.

The trajectory generator 130 performs coordinate transformation between an orthogonal coordinate system and a fisheye camera coordinate system. A one-to-one relationship is established between the coordinates, namely between the orthogonal coordinate system and the fisheye camera coordinate system, and the relationship is stored as correspondence information in the storage 70. The trajectory generator 130 generates a trajectory in the orthogonal coordinate system (orthogonal coordinate system trajectory) and performs coordinate transformation of the trajectory into a trajectory in the fisheye camera coordinate system (fisheye camera coordinate system trajectory). The trajectory generator 130 calculates a risk of the fisheye camera coordinate system trajectory. The risk is an indicator value indicating how high a probability that the mobile object M approaches a barrier is. The risk tends to increase as the distance of the trajectory (trajectory points along the trajectory) and a barrier is shorter and tends to decrease as the distance of the trajectory (trajectory points) and the barrier increases.

In a case in which a risk total value and a risk at each trajectory point satisfy a preset reference (in a case in which a total value is equal to or less than a threshold value Th1 and the risk at each trajectory point is equal to or less than a threshold value Th2, for example), the trajectory generator 130 employs a trajectory that satisfies the reference as a trajectory through which the mobile object moves.

In a case in which the aforementioned trajectory does not satisfy the preset reference, the trajectory generator 130 detects a space that the mobile object M can enter in the fisheye camera coordinate system and performs coordinate transformation of the detected space that the mobile object M can enter in the fisheye camera coordinate system into a space that the mobile object M can enter in the orthogonal coordinate system. The space that the mobile object M can enter is a space in a region in a moving direction of the mobile object M except for barriers and regions in the surroundings of the barriers (regions where risks are set or regions where the risks are equal to or greater than the threshold value). The trajectory generator 130 corrects the trajectory such that the trajectory falls within the range of the space that the mobile object M can enter transformed into the orthogonal coordinate system. The trajectory generator 130 performs coordinate transformation of the orthogonal coordinate system trajectory into the fisheye camera coordinate system trajectory and calculates a risk of the fisheye camera coordinate system trajectory on the basis of the image of the surroundings and the fisheye camera coordinate system trajectory. The processing is repeated to search for a trajectory that satisfies the aforementioned preset reference.

The traveling controller 140 causes the mobile object M to travel along the trajectory that satisfies the present reference. The traveling controller 140 outputs a command value for causing the mobile object M to travel along the trajectory to the traveling drive force output device 200.

The information processor 150 controls various devices and machines included in the mobile object M. The information processor 150 controls, for example, the HMI 30. The information processor 150 acquires sound data input to the microphone and recognizes operations performed on the operation unit.

The traveling drive force output device 200 outputs, to the driven wheel, a traveling drive force (torque) for traveling of the mobile object M. The traveling drive force output device 200 includes, for example, an electric motor and an electronic control unit (ECU) that controls the electric motor. The ECU controls the aforementioned configuration in accordance with information input from the traveling controller 140 or information input from the driving operator 80.

The brake device 210 includes, for example, a brake caliper, a cylinder that delivers an oil pressure to the brake caliper, an electric motor that generates the oil pressure in the cylinder, and a brake ECU. The brake ECU controls the electric motor in accordance with information input from the traveling controller 140 or information input from the driving operator 80 and causes a brake torque in accordance with a brake operation to be output to each wheel.

The steering device 220 includes, for example, a steering ECU and an electric motor. The electric motor causes a force to act on a rack and pinion mechanism and changes the orientation of steering wheels, for example. The steering ECU drives the electric motor in accordance with information input from the traveling controller 140 or information input from the driving operator 80 and changes the orientation of the steering wheels.

[Outline of Control of Mobile Object]

Figure 3:
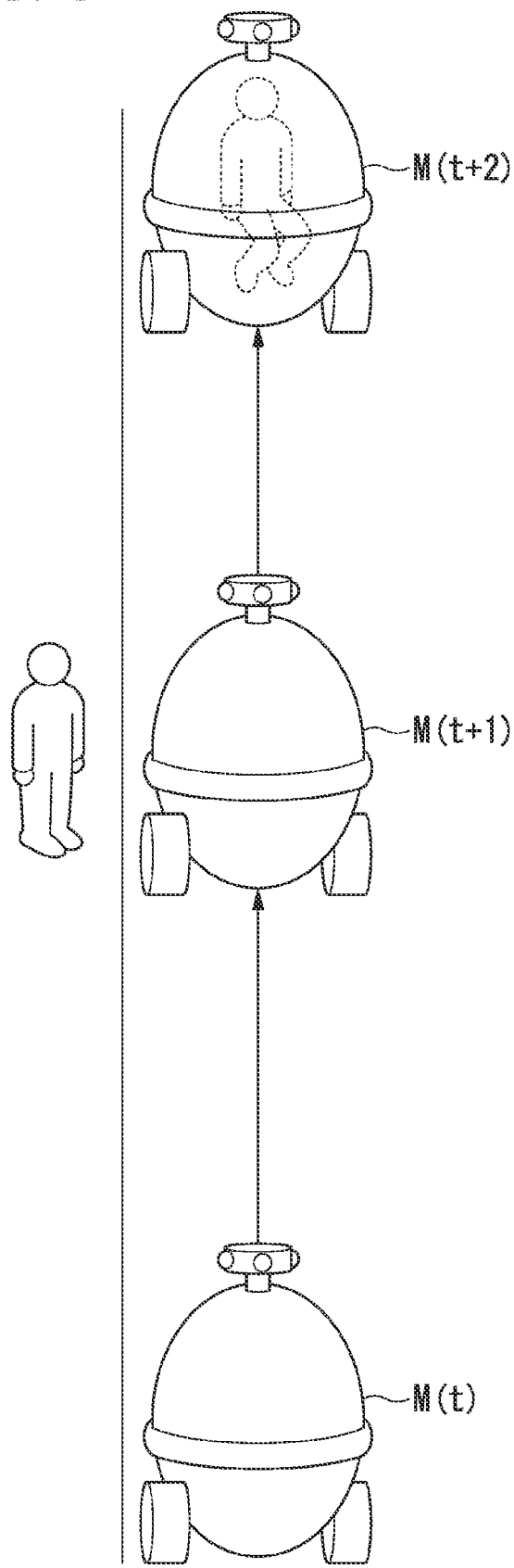
FIG. 3 is a diagram showing an example of actions of the mobile object.
Figure 4:
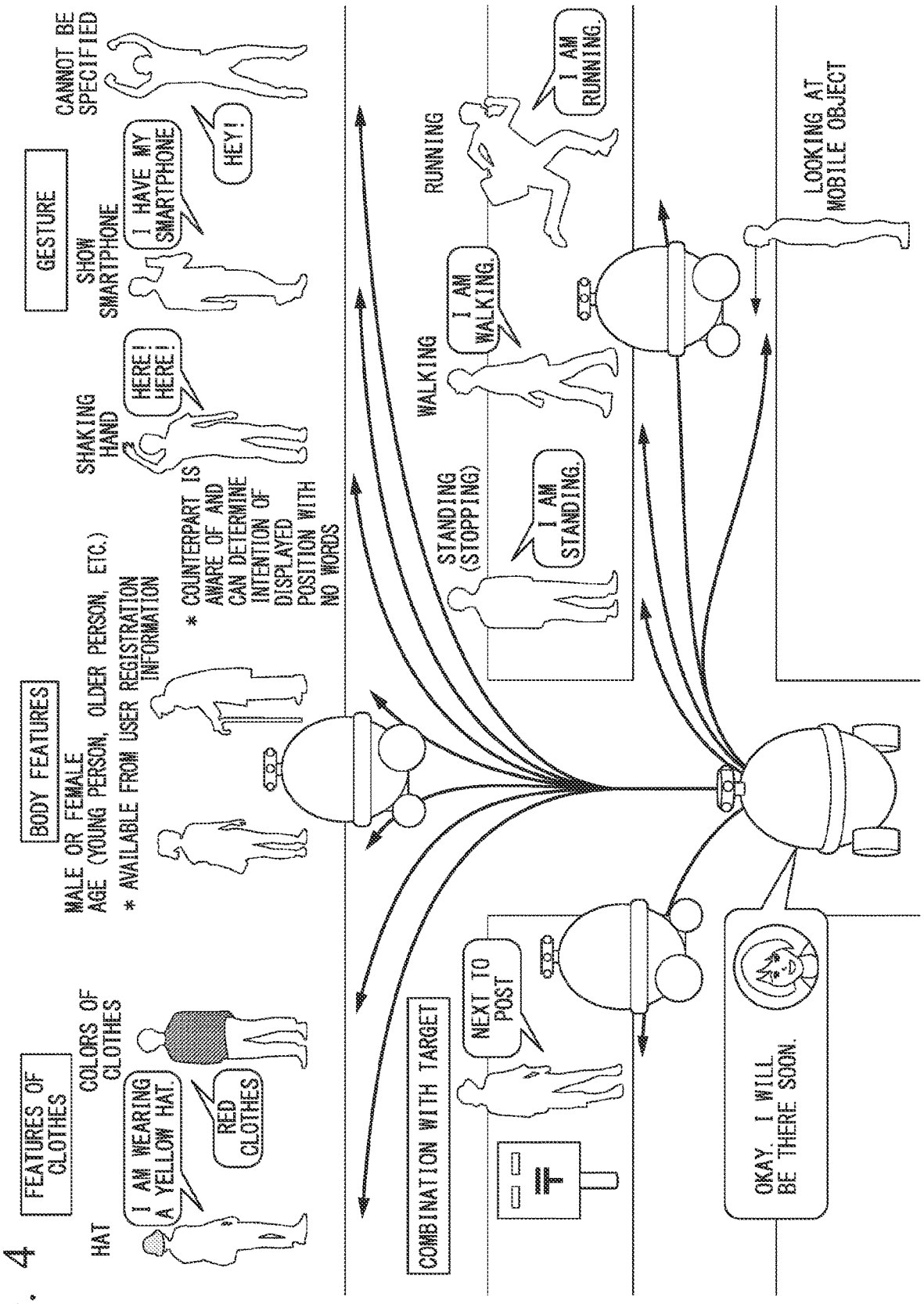
FIG. 4 is a diagram showing an example of information referred to by the mobile object.

FIG. 3 is a diagram showing an example of actions of the mobile object M. The mobile object M specifies a user who desires to receive service provision, travels to a position in accordance with an utterance or a gesture of the user (clock time t), stops at the position, and lets the user get on the mobile object M (clock time t+1). After the user gets on the mobile object M, the mobile object M travels toward the destination of the user (clock time t+2). For example, the user may call the mobile object M near a position designated in advance. As shown in FIG. 4, for example, the mobile object M refers to features of clothes of the user, body features (body features that the user provides to the mobile object M in advance, for example), and a gesture and specifies the user who is waiting near the designated position. Then, the mobile object M stops at the position in accordance with a gesture or a behavior of the specified user. The user can get on the stopping mobile object M and go to the destination.

[Processing for Specifying User (Part 1)]

Figure 5:
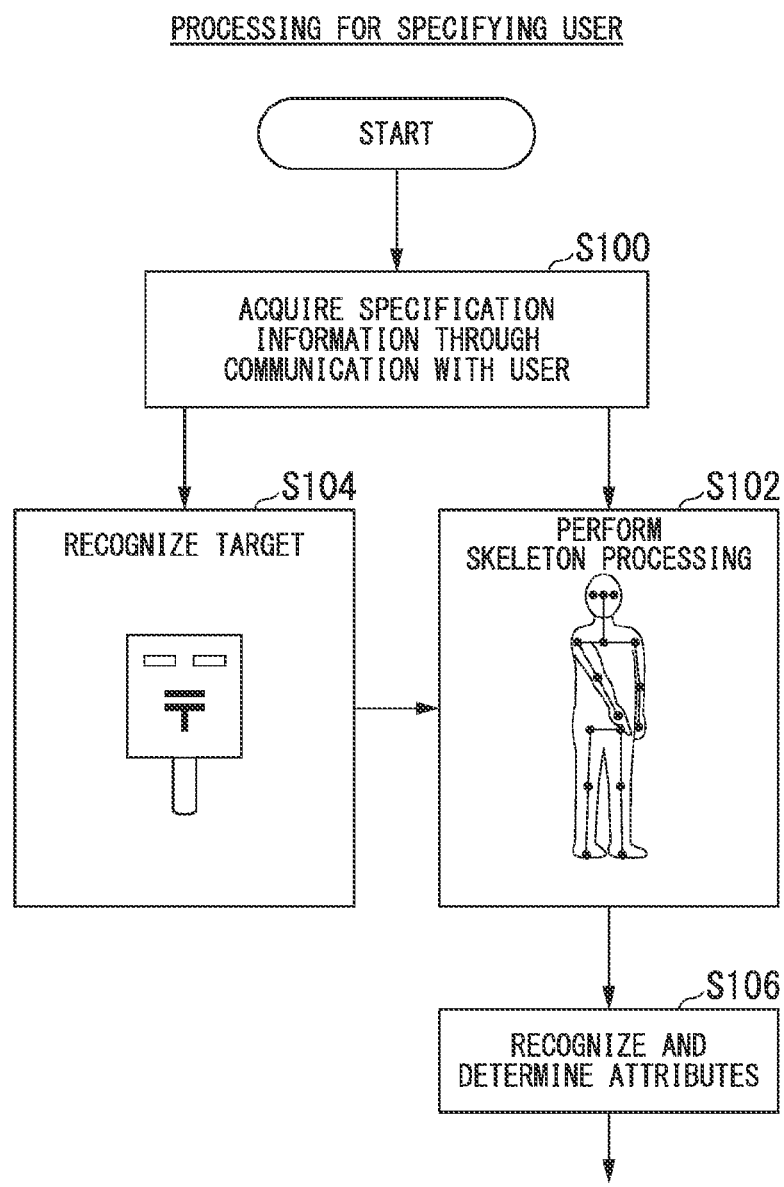
FIG. 5 is a flowchart showing an example of a processing flow for specifying a user by a control device.

FIG. 5 is a flowchart showing an example of a processing flow in which the control device 100 specifies a user. First, the information processor 150 of the control device 100 acquires specification information obtained by the mobile object M through communication with the user (Step S100). The communication may be performed using sound (user's voice) or may be performed through communication with a terminal device that the user has. The specification information is, for example, information indicating an intention of the user to use the mobile object M. In a case in which the user provides an utterance indicating an intention of utilization such as "Here" or "Give me a ride", for example, the utterance is input to a microphone (which may be a microphone in the mobile object M or a microphone of a mobile terminal of the user or a microphone of a device at a road shoulder, which are not shown). The first recognizer 122 analyzes the utterance input to the microphone and recognizes the user's intention on the basis of the analysis result.

Next, the recognizer 120 recognizes attributes of the user on the basis of the image captured by the camera 10 (Step S102). For example, the recognizer 120 recognizes joint points of the user on the basis of the image (executes skeleton processing). For example, the recognizer 120 estimates, from the image, a user's face, face parts, a neck, shoulders, elbows, wrists, waist, ankles, and the like and executes skeleton processing on the basis of the position of each estimated part. For example, the recognizer 120 executes the skeleton processing using a known method (a method such as an open pose, for example) for estimating joint points or a skeleton of the user using deep learning. The recognizer 120 specifies the user's face, the upper body, the lower body, and the like on the basis of a result of the skeleton processing and extracts feature amounts (attributes, for example) based on the face, upper body, lower body, and the like specified. The recognizer 120 determines attributes of the user on the basis of the result of the skeleton processing and an algorithm and pattern matching for determining the attributes and the features of the user.

In a case in which a target is included in the specification information, the recognizer 120 recognizes the target (Step S104). In a case in which the user gives an utterance of "Give me a ride near a post", for example, the corresponding post is recognized. Also, the recognizer 120 executes the skeleton processing on the user who is present near the corresponding post in the processing in Step S102.

Next, the recognizer 120 recognizes and determines the attributes of the user on the basis of the result of the skeleton processing (Step S106). After the processing, the processing proceeds to that in the flowchart in FIG. 8, which will be described latter.

FIG. 6 is a diagram for explaining recognition of feature amounts (attributes) of the user and the target. The attributes of the user include attributes of the clothes and body attributes. The attributes of the clothes include colors of the clothes and presence/absence of a hat. The body attributes include a sex and an age. The target is a target designated by the user. The recognizer 120 specifies the user with the attributes that conform to the attributes stored in the storage 180 on the basis of the attributes of the user using the mobile object M and stored in the storage 180 in advance and the attributes determined on the basis of the image.

[Processing for Specifying User (Part 2)]

The control device 100 recognizes the behaviors shown in FIG. 7 on the basis of the image, performs the processing shown in FIG. 8, which will be described later, and specifies the user. FIG. 7 is a diagram for explaining examples of behaviors. The behaviors are, for example, (1) to (7).

Figure 8:
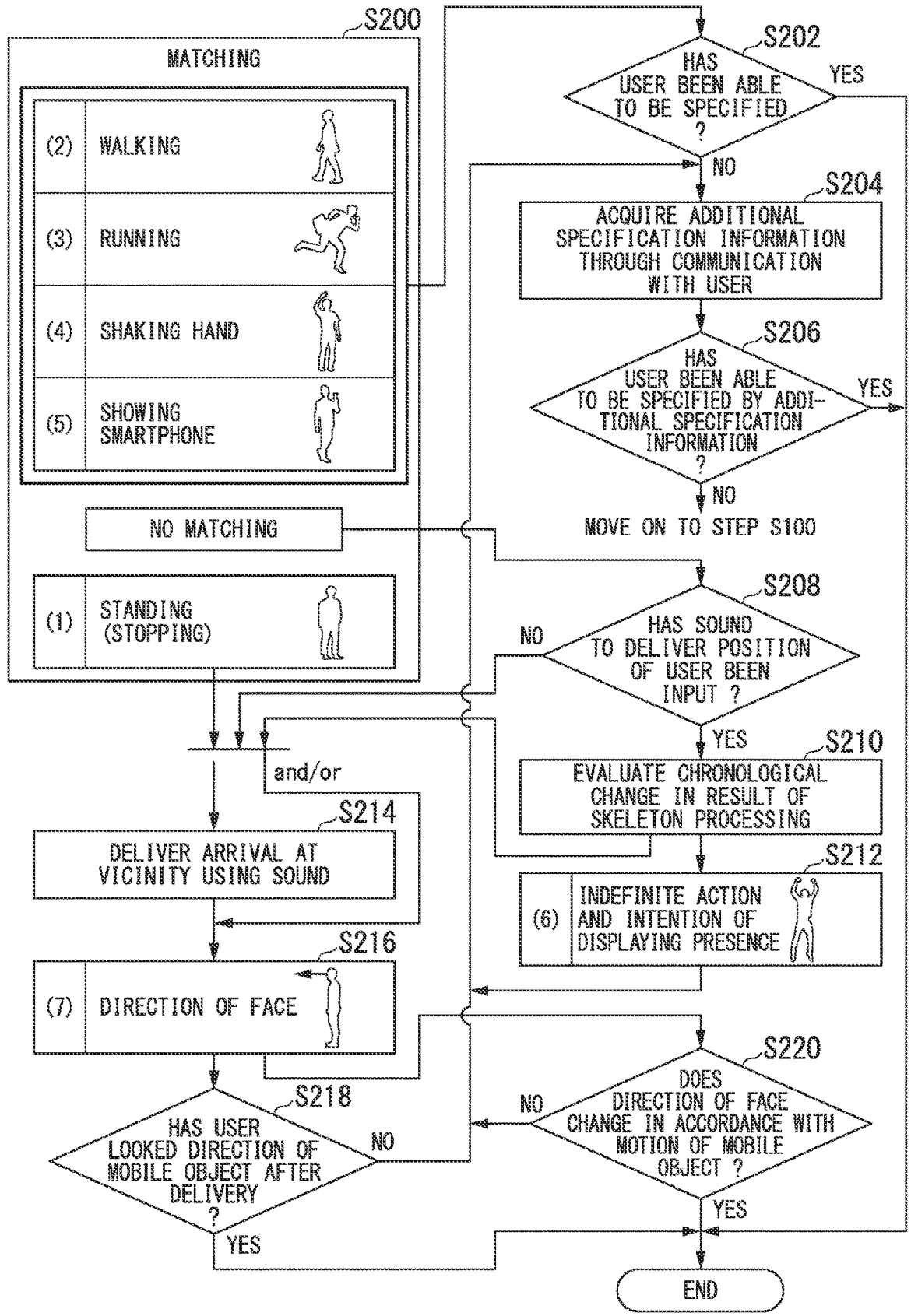
FIG. 8 is a flowchart showing an example of a processing flow for specifying a user by the control device.

(1) Standing (or stopping)
(2) Walking
(3) Running
(4) Shaking a hand
(5) Showing a smartphone
(6) Performing an indefinite action or an action indicating presence (presence display intention)
(7) Directing a face in a predetermined direction FIG. 8 is a flowchart showing an example of a processing flow in which the control device 100 specifies the user. After the processing in Step S106 in FIG. 5, the recognizer 120 performs matching processing (Step S200). For example, the recognizer 120 recognizes a behavior of the user and determines whether the recognized behavior (including a gesture) conforms to a behavior stored in the storage 180 on the basis of the image captured by the camera 10.

In a case in which the behavior of the user conforms to the aforementioned behaviors (2) to (5), the control device 100 determines whether or not the user has been able to be specified (Step S202). In a case in which the user has been able to be specified, processing of one routine in the flowchart ends. For example, the control device 100 specifies the user by referring to the attributes of the clothes and the body attributes of the user.

In a case in which it is not possible to specify the user in the processing in Step S202, the control device 100 acquires additional specification information (for example, sound such as "Here" or "Here I am") by the mobile object M communicating with the user (Step S204). Next, the control device 100 determines whether or not the user has been able to be specified from the additional specification information (Step S206). In a case in which the user has not been able to be specified from the additional specification information, the processing returns to Step S100 in FIG. 5. In a case in which the user has been able to be specified by the additional specification information, the processing of one routine in the flowchart ends.

In a case in which the behavior of the user does not conform to the aforementioned behaviors (1) to (5) (in a case of no matching), the control device 100 determines whether or not sound to transmit the position of the user has been input (Step S208). For example, whether or not sound such as "Hey", "Here", or "Here I am" has been input is determined. In a case in which sound to transmit the position of the user is input, the control device 100 performs skeleton processing, evaluates a chronological change, and recognize the behavior of the user (Step S210).

In a case in which the user has performed the aforementioned behavior (6) in the result of the recognition in Step S210 (in a case in which a user's chronological change is large), the processing proceeds to Step S204. In a case in which the user has not performed the aforementioned behavior (6) in the recognition result in Step S210 (in a case in which the user's chronological change is small), the processing proceeds to Step S214 or S216. In a case in which the sound to transmit the position of the user has not been input in Step S208 described above, the processing proceeds to Step S214 or S216.

In a case in which some or all of the following conditions 1 to 3 are satisfied, for example, the processing proceeds to Step S214 or Step S216 (the following description will be given on the assumption that the processing in Step S214 is performed before the processing in Step S216).

The condition 1 is that the sound to transmit the position of the user has not been input in Step S208.

The condition 2 is that the user has not performed the aforementioned behavior (6) in Step S210.

The condition 3 is that the user's behavior conforms to the aforementioned behavior (1).

In a case in which some or all of the conditions 1 to 3 are satisfied, the control device 100 transmits through sound that the mobile object M has arrived a location near the user (Step S214). If some or all of the conditions 1 to 3 are satisfied, and after the processing in Step S214, the control device 100 recognizes the orientation of the user's face (Step S216).

After Step S216, the control device 100 transmits the sound in Step S214, for example, and then determines whether or not the user has looked in the direction of the mobile object M (Step S218). In a case in which the user has looked in the direction of the mobile object M, the user is specified as a user who is using the mobile object M, and the processing of one routine in the flowchart ends. In a case in which the user has not looked in the direction of the mobile object M, the processing proceeds to Step S204.

After Step S216, the control device 100 determines whether or not the orientation of the user's face has changed in accordance with a motion of the mobile object M (Step S220). In a case in which the orientation of the user's face has changed in accordance with a motion of the mobile object M, the user is specified as a user who uses the mobile object M, and the processing of one routine in the flowchart ends. In a case in which the orientation of the user's face has not changed in accordance with a motion of the mobile object M, the processing proceeds to Step S204.

As described above, the control device 100 can communicate with the user and accurately specify the user who is scheduled to use the mobile object M in response to a behavior or a reaction of the user even in an environment in which many people are present, for example.

The control device 100 specifies the user, then determines one or both the stop position or the traveling position on the basis of the behavior of the specified user, and controls the mobile object M on the basis of the result of the determination.

Figure 9:
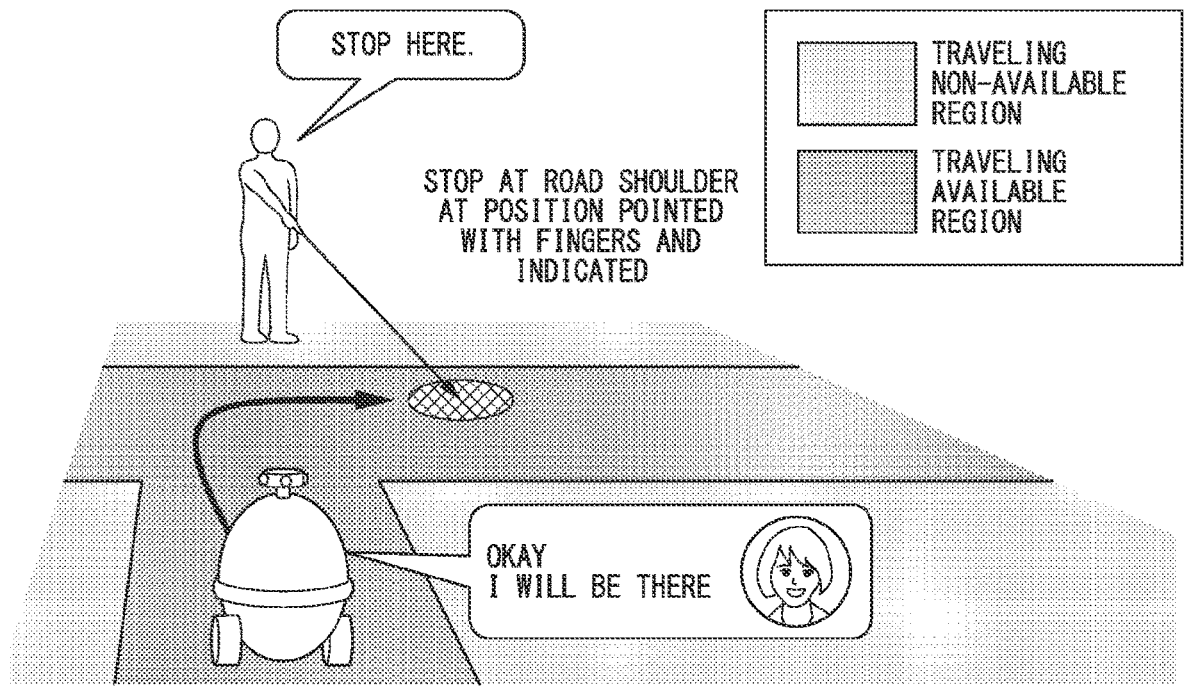
FIG. 9 is a diagram (part 1) showing an example of a behavior of the mobile object.

FIG. 9 is a diagram (part 1) showing an example of a behavior of the mobile object M. The control device 100 causes the mobile object M to stop at a position pointed to and indicated in an entrance available region (hereinafter, a stop position). The control device 100 recognizes an entrance available region and an entrance non-available region and generates a trajectory to the stop position in the entrance available region. The control device 100 causes the mobile object M to travel along the generated trajectory and causes the mobile object M to stop at the stop position. The stop position is, for example, a pointed and indicated position and a shoulder of a road. An example of a method for specifying a pointed and indicated stop position will be described later. The entrance available region (first region) is a region that the mobile object M can enter. The entrance non-available region (second region) is a region that the mobile object M cannot enter or a region that is not suitable for traveling of the mobile object M. The entrance available region is, for example, a roadway, while the entrance non-available region is, for example, a sidewalk.

Figure 10:
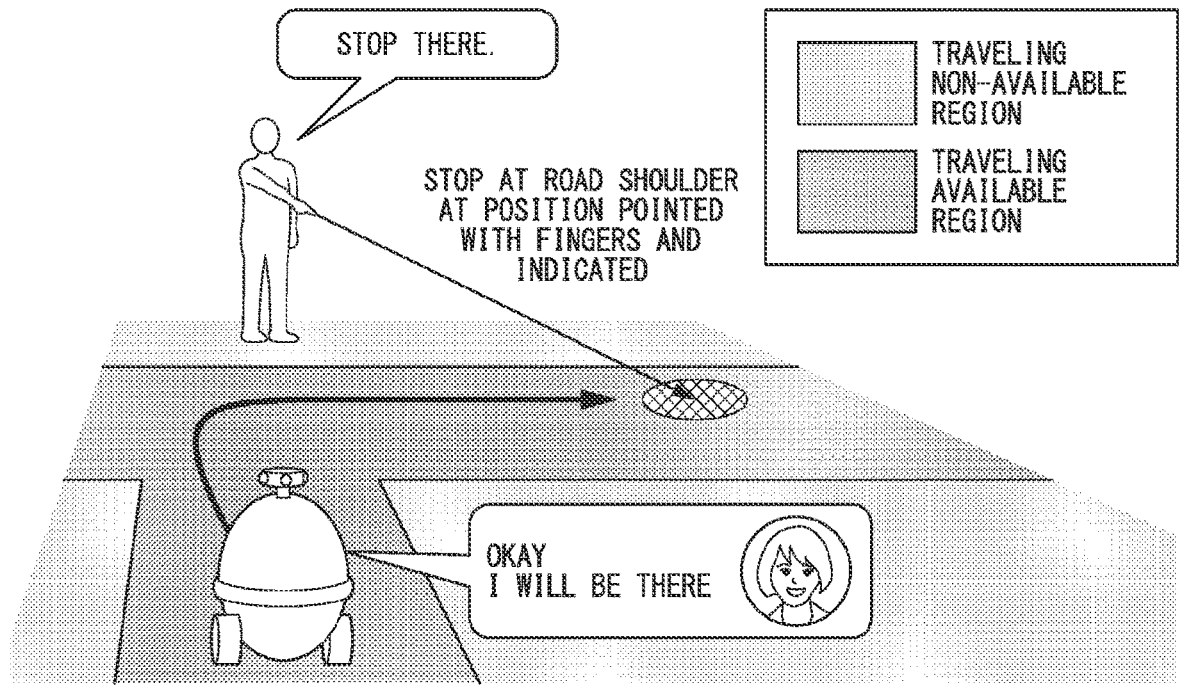
FIG. 10 is a diagram (part 2) showing an example of a behavior of the mobile object.

FIG. 10 is a diagram (part 2) showing an example of a behavior of the mobile object M. In FIG. 10, the user is pointing and providing an indication, and the stop position corresponding to the indication is a position that is further from the user than the stop position in FIG. 9. The mobile object M stops at the stop position similarly to FIG. 9 in this case as well.

Figure 11:
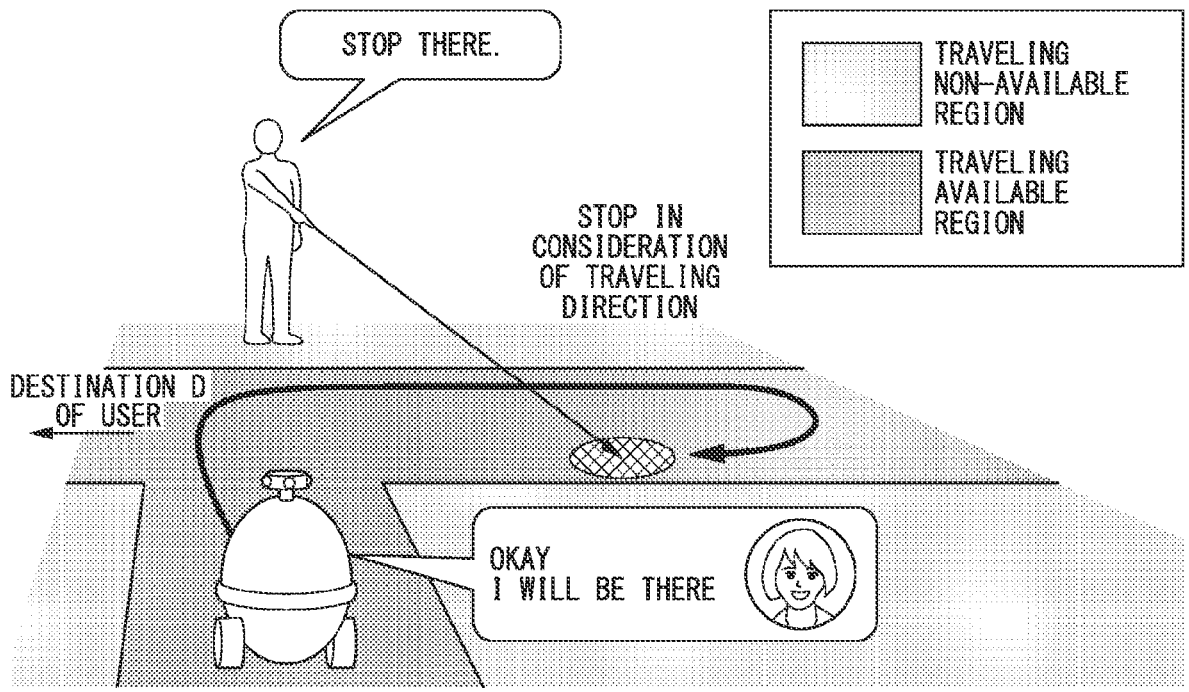
FIG. 11 is a diagram (part 3) showing an example of a behavior of the mobile object.

FIG. 11 is a diagram (part 3) showing an example of a behavior of the mobile object M. In FIGS. 9 and 10 described above, the stop position is on a first side out of the first side and a second side of a road. The first side is a side of the entrance non-available region where the user is present, and the second side is a side of the entrance non-available region on the side opposite to the side on which the user is present. The stop position is assumed to be set on the second side in FIG. 11. The destination of the user is assumed to be located in the direction D shown in FIG. 11. In this case, the mobile object M stops at the stop position in consideration of the direction of the destination and the direction of traveling after the user gets thereon.

For example, the control device 100 acquires the destination of the user in advance and generates a trajectory to arrive at the stop position on the basis of the acquired destination and the stop position. In the example in FIG. 11, the control device 100 causes the mobile object M to pass through the stop position, then causes the mobile object M to turn, causes the mobile object M to travel such that the front thereof faces the direction of the destination, and causes the mobile object M to stop at the stop position such that the mobile object M can travel in the direction of the destination without turning after the user gets on the mobile object M. In this manner, the mobile object M can quickly and smoothly go to the destination after the user gets on the mobile object M. The processing described above with reference to FIG. 11 is an example of the processing in which "the determiner causes the orientation of the mobile object when the mobile object stops at the stop position to be directed to the direction of the route directed to the destination of the user".

Figure 12:
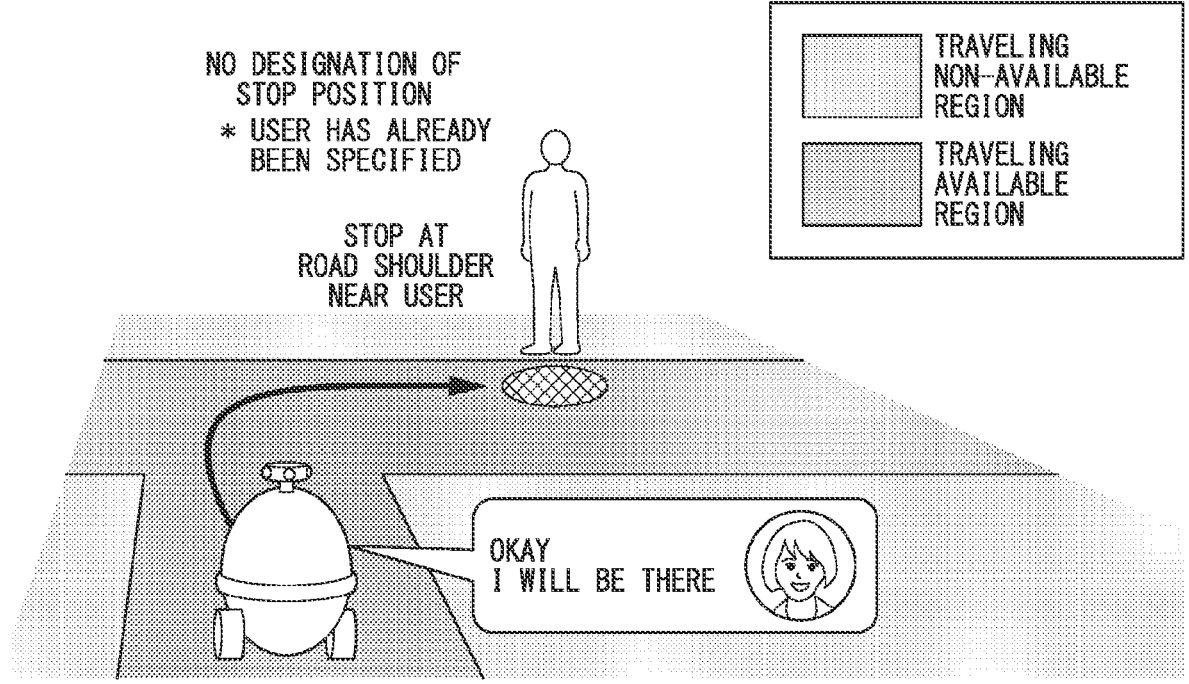
FIG. 12 is a diagram (part 4) showing an example of a behavior of the mobile object.

FIG. 12 is a diagram (part 4) showing an example of a behavior of the mobile object M. In a case in which the user has not designated the stop position, the mobile object M stops in the entrance available region near the user. In a case in which the control device 100 has specified the user and the user is standing upright, for example, the control device 100 causes the mobile object M to stop at a position near the user.

Figure 13:
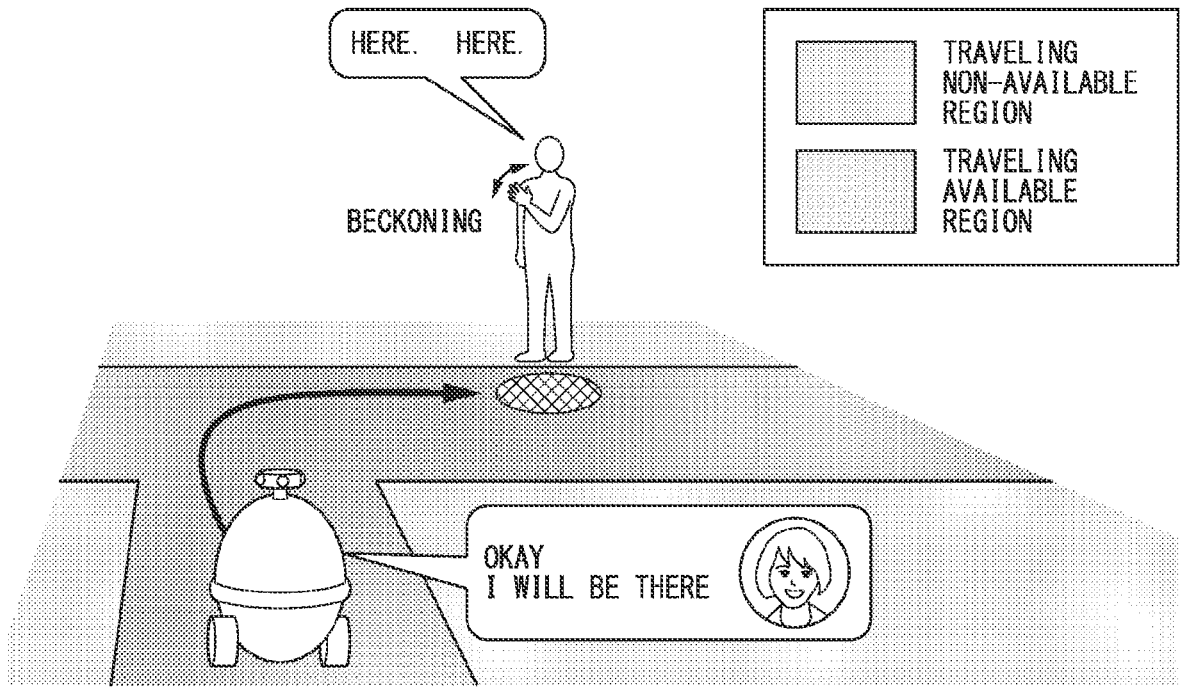
FIG. 13 is a diagram (part 5) showing an example of a behavior of the mobile object.

FIG. 13 is a diagram (part 5) showing an example of a behavior of the mobile object M. In a case in which the user has not designated the stop position and has performed a predetermined behavior indicating approaching to the user, such as beckoning or shaking of a hand ("in a case in which the first recognizer recognizes an indication of approaching to the user using a gesture of the user"), the mobile object M approaches the user (a stopping user, for example), and the mobile object M stops in the entrance available region near the user. The stop position may be the same position as the stop position described in FIG. 12 or may be changed in accordance with a behavior of the user such as beckoning, for example. In a case in which the mobile object M arrives at the stop position described in FIG. 12 and the user is performing beckoning at that time, for example, the mobile object M may further approach the user.

Figure 14:
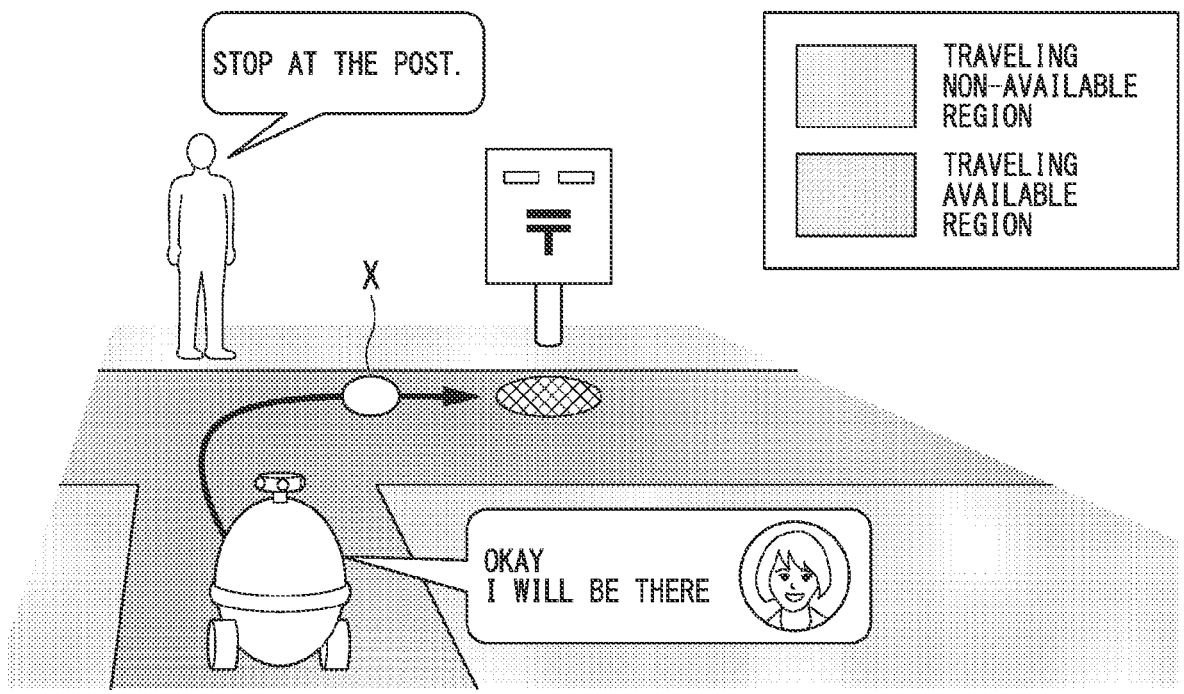
FIG. 14 is a diagram (part 6) showing an example of a behavior of the mobile object.

FIG. 14 is a diagram (part 6) showing an example of a behavior of the mobile object M. In a case in which the user designates a specific target and provides an indication (utterance) to stop, the control device 100 causes the mobile object M to stop at a position corresponding to the target in the entrance available region. As shown in FIG. 14, in a case in which the user provides an indication of "Stop at the post", the mobile object M stops in the entrance available region before the post. If the interval between the mobile object M and the post is equal to or less than a threshold value in a case in which the mobile object M stops, the control device 100 may cause the mobile object M to stop at a position before the post (a position X offset on the side close to the user in FIG. 14) because it is not easy for the user to get on the mobile object M. The processing is an example of the processing in which "the determiner determines the stop position on the basis of the position with deviation from the boundary within the predetermined range in the direction of the user".

Figure 15:
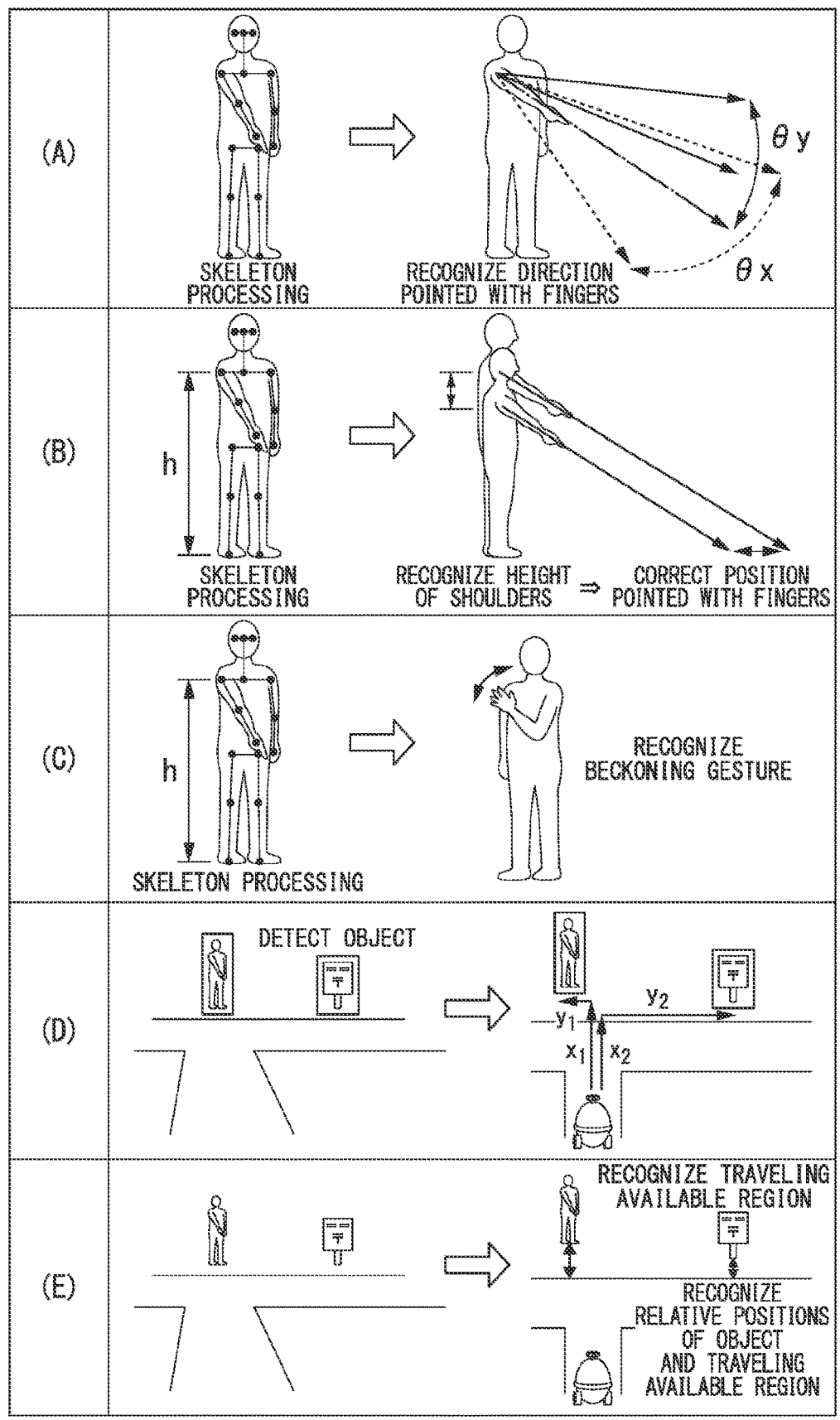
FIG. 15 is a diagram showing an example of an idea used in the aforementioned processing described in FIGS. 9 to 14 and information to be recognized.

FIG. 15 is a diagram showing an example of an ideal used in the processing described above in FIGS. 9 to 14 and information to be recognized. The recognizer 120 recognizes a behavior of the user, a target, and a stop position using (A) to (E) below.

(A) The recognizer 120 performs skeleton processing, recognizes arms, hands, fingers of the user, and recognizes positions indicated by the recognized arms, hands, and fingers (the positions in the vertical direction and the horizontal direction).

(B) The recognizer 120 performs skeleton processing, recognizes positions of arms, hands, fingers, and shoulders of the user and corrects the direction pointed by the recognized arms, hands, and fingers on the basis of the height of the shoulders.

(C) The recognizer 120 performs skeleton processing, recognizes arms, hands, and fingers of the user and recognizes a gesture performed by the recognized arms, hands, and fingers (for example, beckoning).

(D) The recognizer 120 recognizes the user and a target designated by the user and recognizes relative positions of the mobile object M and the target.

(E) The recognizer 120 executes semantic segmentation processing, for example, and recognizes the entrance available region, relative positions of the targets and the entrance available region, and the like as described above.

[Flowchart for Processing of Determining Stop Position (Part 1)]

Figure 16:
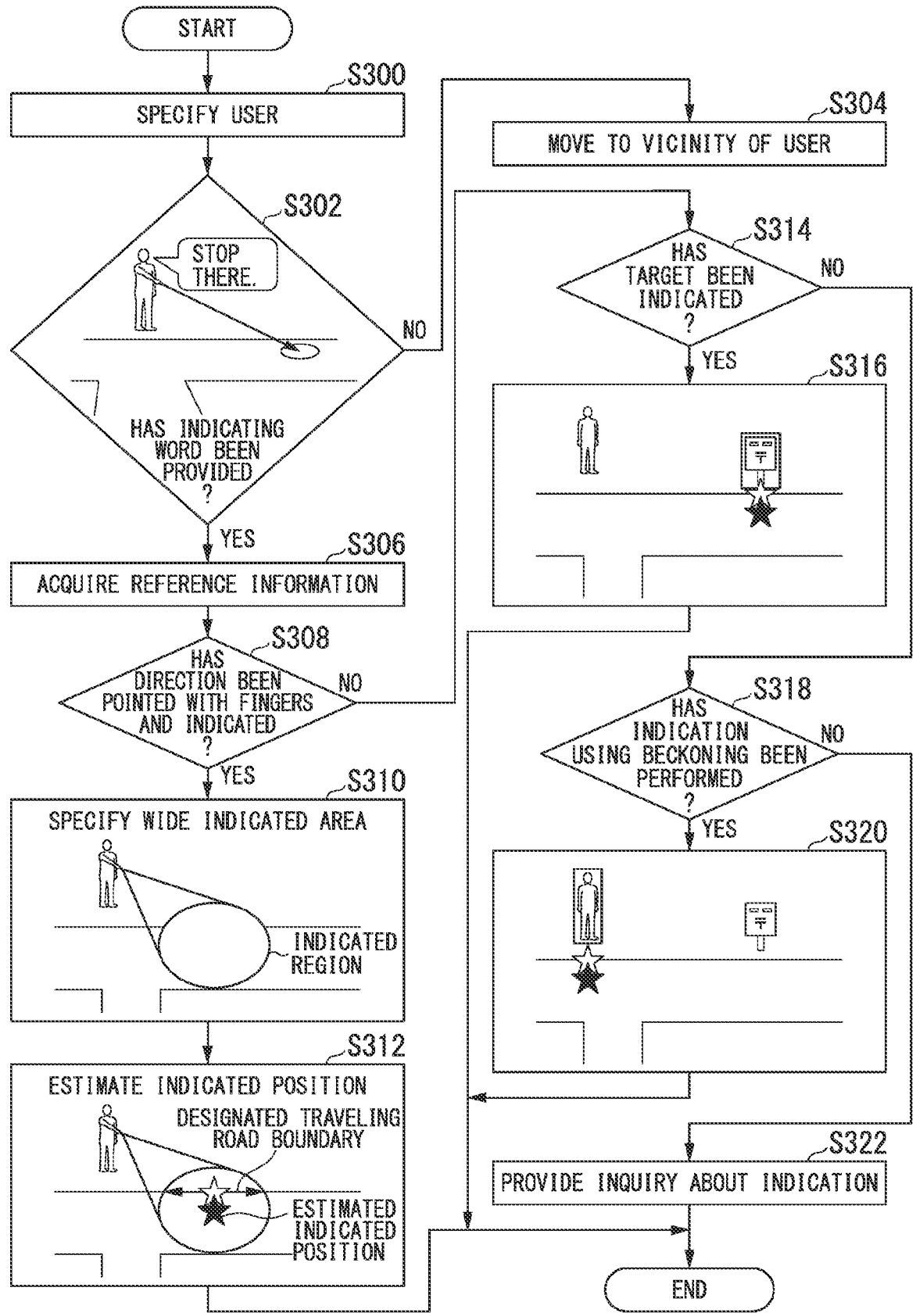
FIG. 16 is a flowchart showing an example of a processing flow executed when the control device determines a stop position.

FIG. 16 is a flowchart showing an example of a processing flow executed when the control device 100 determines a stop position. The stop position in Step S304 in the flowchart is a stop position corresponding to FIG. 12, and the stop position in Step S312 is a stop position corresponding to FIGS. 9 to 11 described above. The stop position in Step S316 in the flowchart is a stop position corresponding to FIG. 14, and the stop position in Step S320 is a stop position corresponding to FIG. 13 described above. A star mark, which will be described later, is an example of a stop position based on a boundary, and a route to stop at the star mark, which will be described later, (the route shown in FIGS. 9 to 14) is an example of a traveling position based on the boundary.

First, the control device 100 specifies the user as described in the flowchart in FIG. 8 (Step S300). Next, the information processor 150 determines whether or not an indicating word for designating the stop position is included in an utterance of the user (Step S302).

In a case in which the indicating word for designating the stop position is not included in the utterance of the user, the control device 100 causes the mobile object M to move to the vicinity of the user (Step S304). In a case in which the indicating word for designating the stop position is included in the utterance of the user, the recognizer 120 acquires reference information for determining the stop position (Step S306). The reference information is information (A) to (E) described in FIG. 15.

Next, the recognizer 120 determines whether or not the user points with fingers and indicates a direction (Step S308). In a case in which the user points with fingers and indicates a direction, the recognizer 120 specifies a wide indicated region pointed with fingers and indicated by the user (Step S310). Next, the recognizer 120 estimates the position indicated by the user (Step S312). For example, the recognizer 120 recognizes a boundary (designated traveling road boundary) between the entrance available region and the entrance non-available region included in the indicated wide region. The recognizer 120 sets a star mark of a predetermined position for a boundary in the indicated wide region and determines a position offset from the predetermined position with the star mark by a predetermined distance in the direction of the entrance available region an indicated position (the position pointed with fingers and indicated by the user) with a black star mark. In this manner, the processing in the flowchart ends.

The aforementioned processing in Step S312 is an example of the processing in which "in a case in which the first recognizer recognizes that the user indicates the stop position using a gesture, the determiner determines the position with deviation from the boundary by the predetermined amount in the direction of the first direction as the stop position on the basis of the indication".

In a case in which the user does not points with fingers and indicates the direction, the recognizer 120 determines whether or not a target has been indicated (Step S314). In a case in which it is determined that a target has been indicated, the recognizer 120 sets the predetermined position with the star mark at the boundary in the vicinity of the indicated target and determines a position offset from the predetermined position with a star mark by a predetermined distance in the direction of the entrance available region as the indicated position with the black star mark (Step S316). The processing is an example of the processing in which "in a case in which the first recognizer recognizes that the user designates a target and indicates stopping of the mobile object at the position based on the target, the determiner determines the position with deviation from the boundary within the predetermined range by the predetermined amount in the direction of the first region as the stop position on the basis of the position of the target and the boundary within the predetermined range from the target".

In a case in which it is determined that no target has been indicated, the recognizer 120 determines whether or not indication of beckoning has been performed (Step S318). In a case in which an indication of beckoning has been performed, the recognizer 120 sets the predetermined position with the star mark at the boundary in the vicinity of the user who is performing beckoning and determines a position offset from the predetermined position with the star mark in the predetermined distance in the direction of the entrance available region as the indicated position with the black star mark (Step S320). The processing is an example of the processing in which "in a case in which the first recognizer recognizes an indication of approaching the user using a gesture of the user, the determiner determines the position with deviation from the boundary within the predetermined range by the predetermined amount in the direction of the first region as the target position on the basis of the position of the user and the boundary within the predetermined range from the user.

In a case in which the indication of beckoning has not been performed, the control device 100 asks the user about the indication (Step S322). The inquiry may be a sound inquiry or may be an inquiry using a message via communication. In this manner, the processing in one routine in the flowchart ends.

As described above, the control device 100 can realize control that better reflects the user's intention by recognizing sound and a behavior of the user, communicating with the user, and determining the stop position.

[Flowchart (Part 2) of Processing for Determining Stop Position]

Figure 17:
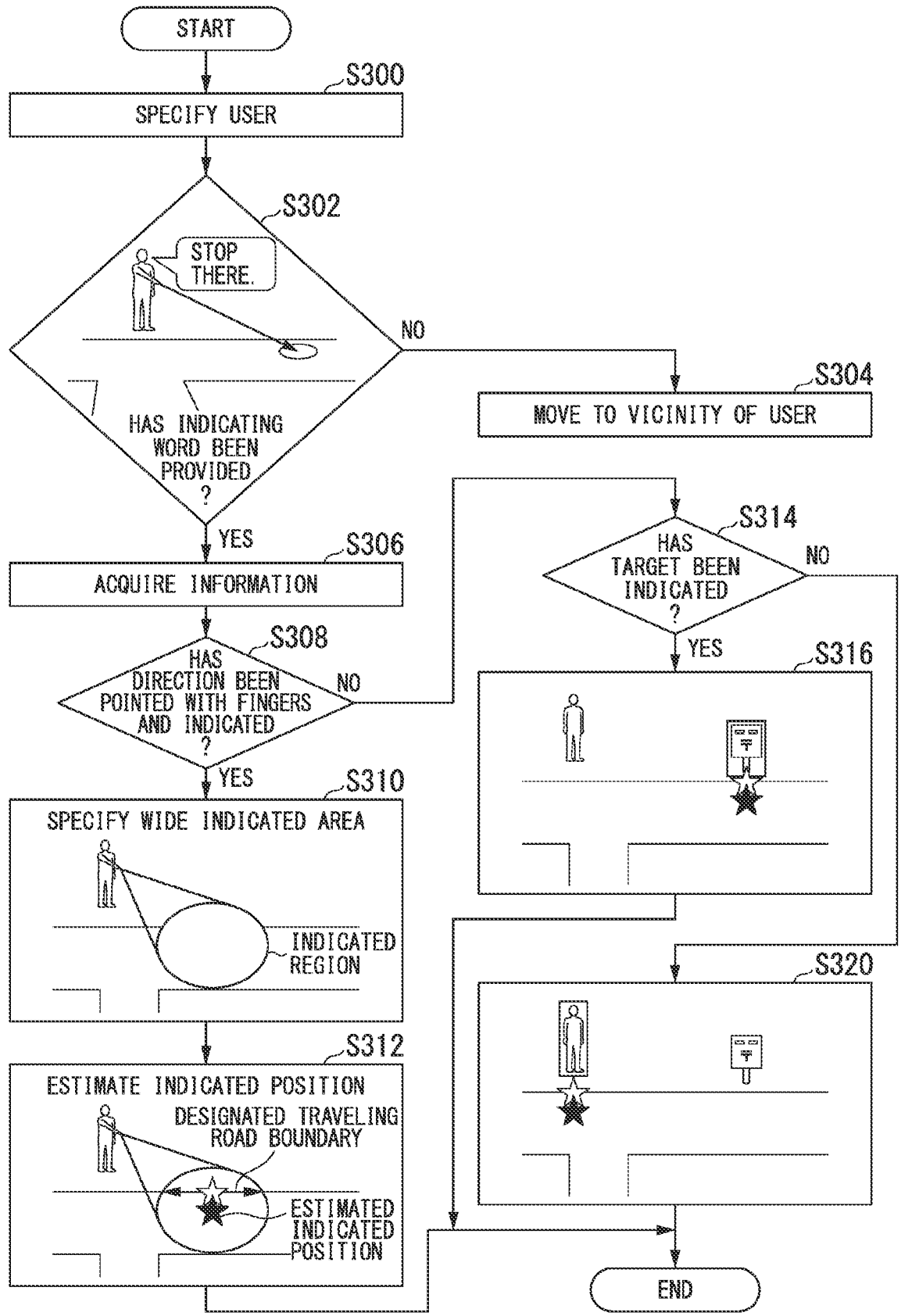
FIG. 17 is a flowchart showing another example of the processing flow executed when the control device determines a stop position.

FIG. 17 is a flowchart showing another example of a processing flow executed when the control device 100 determines a stop position. Points different from those in the processing in the flowchart in FIG. 16 will be described. In the present processing, one of or both recognition processing (B) and recognition processing (C) described in FIG. 15 are omitted. In the present processing, recognition of the height of the shoulders, correction based on the result of recognizing the height of the shoulders, and processing for recognizing beckoning, for example, are omitted. A preset height is used as the height of the shoulders. Even in a case in which (B) and (C) are omitted in this manner, accuracy of determining the stop position is secured with an arithmetic operation load suppressed.

In FIG. 17, the processing in Steps S318 and S322 in FIG. 16 is omitted. In a case in which the target has not been indicated in Step S314, the processing in Step S320 is executed. In this manner, the processing in one routine in the flowchart ends.

The control device 100 can realize control that better reflects the user's intention by more easily recognizing sound and a behavior of the user, communicating with the user, and determining the stop position in the aforementioned processing.

In regard to the estimation of the position pointed with fingers, the method disclosed in Japanese Unexamined Patent Application, First Publication No. 2009-223172 or another known method is used. In a case in which the position pointed with fingers is estimated, for example, various parameters such as the height of the shoulders, the width of the shoulders, the visual direction, and the height of eyes in addition to the direction pointed with fingers and indicated may be taken into consideration.

According to the aforementioned embodiments, the control device 100 recognizes the first region that the mobile object M can enter and the second region that the mobile object M cannot enter on the basis of an image, determines the stop position at which the mobile object M will stop or the target position to which the mobile object M will move on the basis of the indication of the user, the first region that the mobile object M can enter, and the second region that the mobile object M cannot enter, and can thereby realize control that better reflects the user's intention.

The embodiments described above can be expressed as follows.

A mobile object control device including:
a storage device storing instructions; and
one or more processors,
in which the one or more processors execute the instructions stored in the storage device to:
  acquire an image,
  recognize an indication of a user,
  recognize a first region that a mobile object is able to enter and a second region that the mobile object is not able to enter on the basis of the image, and
  determine one of or both a stop position at which the mobile object will stop and a target position to which the mobile object will move on the basis of the indication from the user, the first region that the mobile object is able to enter, and the second region that the mobile object is not able to enter.

Although the forms for performing the present invention have been described using the embodiments, the present invention is not limited to such embodiments at all, and various modifications and replacements can be made without departing from the gist of thee invention.

What is claimed is:

1. A mobile object control system comprising:
a storage device configured to store instructions; and
one or more processors,
wherein the one or more processors execute the instructions stored in the storage device to:
  acquire an image,
  recognize an indication of a user,
  recognize a first region that a mobile object is able to enter and a second region that the mobile object is not able to enter on the basis of the image,
  decide a target position to which the mobile object will move on the basis of the indication from the user, the first region that the mobile object is able to enter, and the second region that the mobile object is not able to enter,
  cause the mobile object to move to the determined target position,
  wherein the first region and the second region are adjacent to each other,
  wherein the first region and the second region extend in a reference direction,
  recognize an indication of the target position using a gesture of the user,
  detect a boundary between the first region and the second region, the boundary being associated with the target position using a gesture of the user, and
  determine, as the target position, a position with deviation from the boundary by a predetermined amount in a direction of the first region on the basis of the indication,
  wherein the direction of the first region is a direction intersecting the reference direction and from the second region to the first region.

2. The mobile object control system according to claim 1, wherein the one or more processors execute the instructions to:
  detect a boundary between the first region and the second region, and
  determine the target position on the basis of the boundary.

3. The mobile object control system according to claim 2, wherein the one or more processors execute the instructions to:
  in a case in which an indication of the target position using a gesture of the user is recognized, determine, as the target position, a position with deviation from the boundary by a predetermined amount in a direction of the first region on the basis of the indication.

4. The mobile object control system according to claim 2, wherein the one or more processors execute the instructions to:
  in a case in which an indication of the target position that accompanies a user's designation of a target is recognized, determine, as the target position, a position with deviation from the boundary within a predetermined range from the target by a predetermined amount in a direction of the first region on the basis of the position of the target and the boundary within the predetermined range.

5. The mobile object control system according to claim 4, wherein the one or more processors execute the instructions to:
  determine a position with deviation from the boundary within the predetermined range in a direction of the user as the target position on the basis of the obtained boundary.

6. The mobile object control system according to claim 2, wherein the one or more processors execute the instructions to:
  in a case in which an indication of approaching the user using a gesture of the user is recognized, determine a position with deviation from the boundary within a predetermined range from the user by a predetermined amount in a direction of the first region as the target position on the basis of a position of the user and the boundary within the predetermined range.

7. The mobile object control system according to claim 6, wherein the target position is a stop position, and
the one or more processors execute the instructions to:
  in a case in which the indication of approaching the user who is waiting for the vehicle using the gesture of the user requesting the vehicle to stop is recognized, determine the position with deviation of the predetermined amount as the stop position.

8. The mobile object control system according to claim 1, wherein the target position is a stop position, and
the one or more processors execute the instructions to:
  determine the stop position on the basis of the indication.

9. The mobile object control system according to claim 1, wherein the target position is a stop position, and
the one or more processors execute the instructions to:
  direct an orientation of the mobile object when the mobile object stops at the stop position to a direction of a route directed to a destination of the user.

10. The mobile object control system according to claim 1,
wherein the target position is a stop position, and
the one or more processors execute the instructions to:
  in a case in which the stop position is not able to be determined, cause the mobile object to move into a vicinity of the user.

11. The mobile object control system according to claim 1,
wherein the target position is a stop position, and
the one or more processors execute the instructions to:
  in a case in which the stop position is not able to be determined, ask the user about the stop position.

12. A mobile object comprising:
the control system according to claim 1 mounted therein.

13. A mobile object control system comprising:
a storage device configured to store instructions; and
one or more processors,
wherein the one or more processors execute the instructions stored in the storage device to:
  acquire an image,
  recognize an indication of a user,
  recognize a first region that a mobile object is able to enter and a second region that the mobile object is not able to enter on the basis of the image,
  decide a target position to which the mobile object will move on the basis of the indication from the user, the first region that the mobile object is able to enter, and the second region that the mobile object is not able to enter,
  cause the mobile object to move to the determined target position,
  wherein the first region and the second region are adjacent to each other, wherein the first region and the second region extend in a reference direction,
  detect a boundary between the first region and the second region,
  recognize an indication of the target position that accompanies a user's designation of a target, and
  based on the target, determine, as the target position, a position with deviation, from a first position associated with the boundary within a predetermined range, by a predetermined amount in a direction of the first region,
  wherein the direction of the first region is a direction intersecting the reference direction and from the second region to the first region.

* * * * *